United States Patent
Rossano et al.

(10) Patent No.: US 11,319,151 B2
(45) Date of Patent: May 3, 2022

(54) AUTOMATED STORAGE AND RETRIEVAL SYSTEM

(71) Applicant: ABB Schweiz AG, Baden (CH)

(72) Inventors: Gregory F. Rossano, Enfield, CT (US); Sangeun Choi, Simsbury, CT (US)

(73) Assignee: ABB Schweiz AG, Baden (CH)

( * ) Notice: Subject to any disclaimer, the term of this patent is extended or adjusted under 35 U.S.C. 154(b) by 260 days.

(21) Appl. No.: 16/271,230

(22) Filed: Feb. 8, 2019

(65) Prior Publication Data
US 2020/0255222 A1    Aug. 13, 2020

(51) Int. Cl.
*B65G 1/137*    (2006.01)
*B65G 1/04*    (2006.01)

(52) U.S. Cl.
CPC ......... *B65G 1/1373* (2013.01); *B65G 1/0492* (2013.01)

(58) Field of Classification Search
CPC combination set(s) only.
See application file for complete search history.

(56) References Cited

U.S. PATENT DOCUMENTS

| | | |
|---|---|---|
| 5,147,271 A | 9/1992 | Bacques et al. |
| 5,299,734 A | 4/1994 | Lane |
| 5,848,514 A | 12/1998 | Edwards et al. |
| 6,027,016 A | 2/2000 | Ljungström et al. |
| 8,162,174 B2 | 4/2012 | Hieb et al. |
| 9,242,799 B1 * | 1/2016 | O'Brien ................. G06Q 10/08 |
| 9,637,305 B2 | 5/2017 | Fredette et al. |
| 9,764,526 B2 | 9/2017 | Aganovic et al. |
| 9,815,586 B2 | 11/2017 | Graham et al. |
| 10,064,502 B1 | 9/2018 | Gyori et al. |
| 2008/0061076 A1 * | 3/2008 | Hieb ....................... G07F 11/32 |
| | | 221/220 |
| 2009/0076646 A1 * | 3/2009 | Chadbourne .......... G06Q 10/08 |
| | | 700/214 |
| 2011/0211938 A1 | 9/2011 | Eakins et al. |
| 2011/0223001 A1 | 9/2011 | Martinez et al. |

(Continued)

FOREIGN PATENT DOCUMENTS

| | | |
|---|---|---|
| CN | 108629898 A | 10/2018 |
| CN | 109191688 A | 1/2019 |

(Continued)

OTHER PUBLICATIONS

European Patent Office, Extended European Search Report in European Patent Application No. 20155308.8, 9 pp. (dated Mar. 31, 2020).

*Primary Examiner* — Kyle O Logan
(74) *Attorney, Agent, or Firm* — Leydig, Voit & Mayer, Ltd.

(57) ABSTRACT

An automated storage and retrieval system allows for automated storage and retrieval of products at, for example, a retail facility. The automated storage and retrieval system may include a storage and retrieval machine having a retrieval tool adapted to engage a container and a storage unit having a shelf on which are disposed a plurality of containers. The containers, the retrieval tool, and/or the shelf are configured to facilitate access by the retrieval tool to an individual container of the plurality of containers by, for example, altering the container layout on the shelfs, altering the container geometry, or a combination of such features.

15 Claims, 5 Drawing Sheets

(56) References Cited

U.S. PATENT DOCUMENTS

| | | | | |
|---|---|---|---|---|
| 2012/0029687 A1* | 2/2012 | Hagen | ................ | B65G 1/0407 |
| | | | | 700/218 |
| 2012/0031043 A1* | 2/2012 | Yuyama | ................ | B65B 43/46 |
| | | | | 53/167 |
| 2012/0136477 A1* | 5/2012 | Merrow | ............... | G11B 17/225 |
| | | | | 700/218 |
| 2012/0165986 A1 | 6/2012 | Fulhbrigge et al. | | |
| 2013/0036707 A1* | 2/2013 | Zacchi | ............... | B65D 71/0096 |
| | | | | 53/154 |
| 2013/0310967 A1* | 11/2013 | Olson | ..................... | G07F 9/026 |
| | | | | 700/214 |
| 2015/0210472 A1* | 7/2015 | Nakamura | ........... | B65G 1/0435 |
| | | | | 414/661 |
| 2015/0217948 A1* | 8/2015 | Fahldieck | ............ | B65G 47/847 |
| | | | | 198/617 |
| 2015/0353282 A1* | 12/2015 | Mansfield | ................ | G05D 1/00 |
| | | | | 700/214 |
| 2016/0129587 A1* | 5/2016 | Lindbo | .............. | G05B 19/4189 |
| | | | | 700/218 |
| 2016/0145058 A1* | 5/2016 | Lindbo | ................ | B65G 1/0485 |
| | | | | 700/218 |
| 2016/0280460 A1* | 9/2016 | Porat | .......................... | B25J 5/04 |
| 2017/0124633 A1 | 5/2017 | Natarajan et al. | | |
| 2017/0157779 A1* | 6/2017 | Todorov | ................ | B25J 11/0095 |
| 2017/0334644 A1* | 11/2017 | Otto | ................. | B65G 1/0492 |
| 2018/0186582 A1* | 7/2018 | Borders | ................... | B65G 1/06 |
| 2018/0303136 A1* | 10/2018 | Ma | ........................ | G07F 11/165 |
| 2019/0329978 A1* | 10/2019 | Li | .......................... | B25J 5/007 |
| 2020/0338755 A1* | 10/2020 | Behringer | ............. | B65H 5/006 |

FOREIGN PATENT DOCUMENTS

| | | |
|---|---|---|
| EP | 1699022 A1 | 9/2006 |
| EP | 2858043 A1 | 4/2015 |
| FR | 2630412 A1 | 10/1989 |
| JP | 5918157 B2 | 5/2016 |
| KR | 10-1793617 B1 | 11/2017 |
| KR | 10-2018-0048216 A | 5/2018 |

\* cited by examiner

AUTOMATED STORAGE AND RETRIEVAL SYSTEM

BACKGROUND

Automation is increasingly being utilized in applications such as warehousing, product transportation, and product distribution operations to assist in inventory management. For example, automatic storage and retrieval systems (ASRS) are computer controlled systems for the automated placement and retrieval of items from defined storage locations. In these applications, storage and retrieval machines can move about the location to access items at one area, pick the items, and transport them to another area. For example, items may be moved from a storage location to a location where humans may interact with the items. While in storage or inventory, the items may still be packed in containers such as cartons or crates in which they originally arrived at the facility. Moreover, the containers may be located on storage racks or vertical shelfing units having several tiers in a closely packed arrangement to optimize the available storage space. The present disclosure is directed to systems and methods of facilitating automated access to containers or cartons of items located in storage or inventory.

BRIEF SUMMARY

An automated storage and retrieval system facilitates retrieval of an individual container from a plurality of containers. The system can include a storage and retrieval machine including a retrieval tool adapted to engage the container. A plurality of containers can be disposed adjacently on a shelf. The container, the retrieval tool, and/or the shelf are configured to advantageously facilitate access to an individual container among the plurality of containers to enable the retrieval tool to grasp and handle the container.

DETAILED DESCRIPTION

Figure 1:
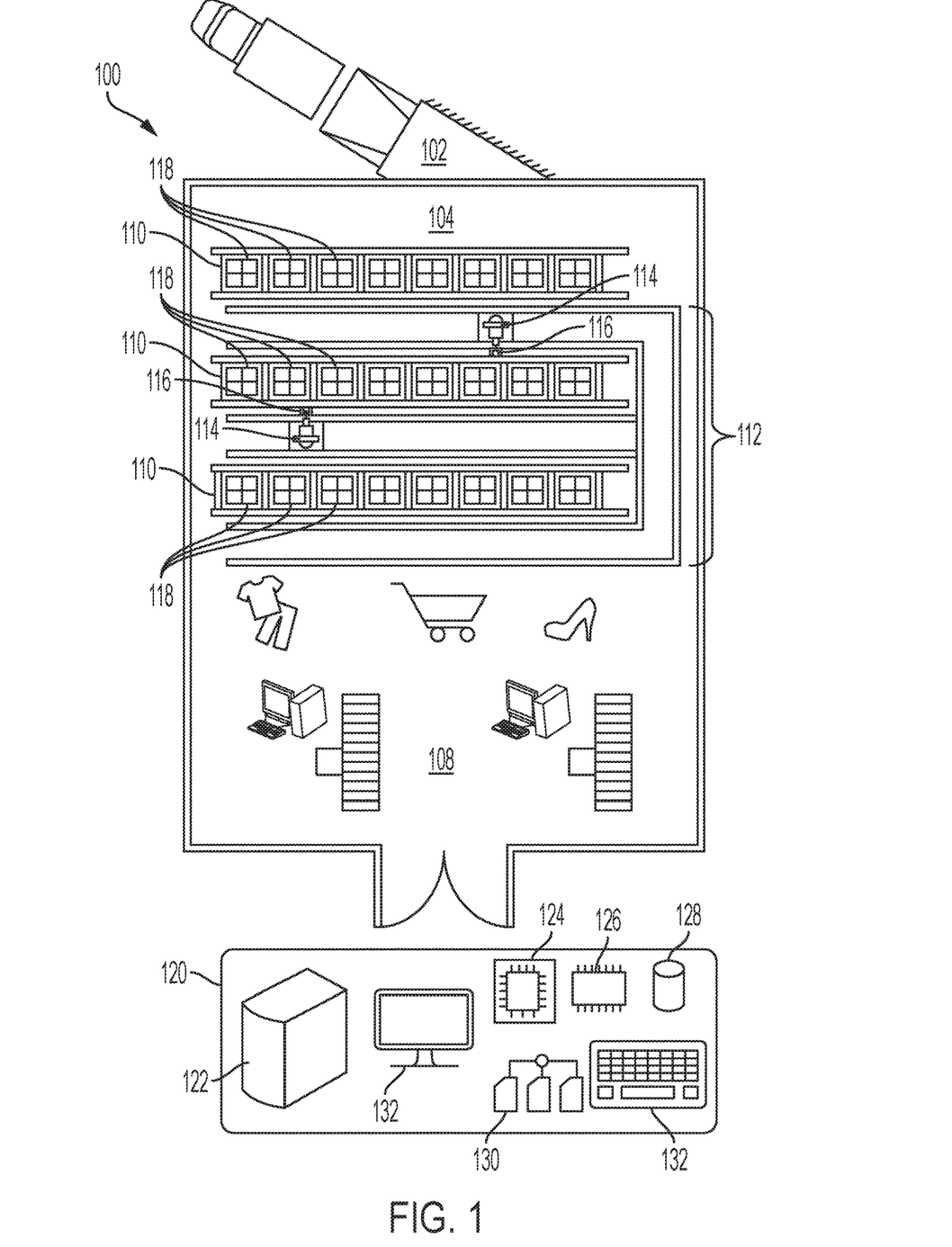
FIG. 1 is a schematic representation of a facility such as a retail store utilizing an automated storage and retrieval system to access and move various items and goods disposed in storage area.

Now referring to the drawings, wherein like reference numbers refer to like elements, there is illustrated a material handling facility 100 which may be the physical location for the temporary storage and distribution of various materials including items and goods. More specifically, the material handling facility 100 can be a building or similar structural enclosure through which various materials are received and transported. In the illustrated example, the material handling facility 100 may be a retail facility where customers come to purchase any number of types of consumer items and merchandising goods for consumption such as, for example, groceries and convenience products, shopping products such as a clothes or books, specialty products, or any other suitable types of consumer items. In other examples, the material handling facility 100 may be a warehouse, distribution center, or manufacturing plant. A common operation at such material handling facilities 100 is the temporary storage and movement of physical items and goods through the facility. The material handling facility 100 may be organized in a plurality of different areas intended for different purposes and functions with respect to the material being handled.

In the example where the material handling facility 100 is a retail facility, the facility may include a receiving area 102, a storage area 104, and a point-of-sale area 108. The receiving area 102 may be configured to accept items into the material handling facility 100 from suppliers and may include a loading dock or other freight equipment for loading or unloading items and goods. The storage area 104 may be configured for the temporary receipt and storage of the items and goods received by the receiving area 102. To store the items and goods, the storage area 104 can include a plurality of storage units 110 which, in the illustrated example, may be a plurality of shelving units or industrial racks. The storage units 110 may be arranged in aisles or otherwise and may be affixed to the floor of the material handling facility 100; however, in another example, the aisles may be reconfigurable with movable storage units. The storage units may also be pallets, flow racks, bins, cabinets, cases, floor locations, or other suitable storage configurations for storing items and goods.

To stock or retrieve the items and goods from the storage units 110, the material handling facility 100 may be operatively associated with an automated storage and retrieval system (ASRS) 112. The ASRS 112 can include one or more storage and retrieval machines 114 that can move among and with respect to the storage units 110 to replace or retrieve the items and goods. To retrieve items and goods from the storage units 110, the storage and retrieval machines 114 can include a retrieval tool 116 configured to grasp or interact with containers 118 stored in the storage units in which the items may be contained. The point-of-sale area 108 may be where customers can interact with or inspect the items and goods and may select the items and goods for purchase. The point-of-sale area 108 can include tables, shelving, refrigerators, freezers, cooling cabinets, or the like and may include checkout lines or self-checkout machines.

To assist and facilitate operation of the material handling facility 100, including the movement of items and goods through the facility, the facility may be operatively associated with a computer system 120. The computer system 120 can include one or more computers 122 that may be configured as personal computers, laptops, notebooks, servers, mini-computers, or the like. Further, the functionality of the computer system 120 can be centralized on one computer or distributed among a plurality of computers 122 networked together and the computer system may be considered a computer network to communicate and exchange information and data between various nodes. The computer system 120 may be associated with an architecture that defines its hardware and software components and their arraignment and the data processing capabilities of the system. For example, to execute instructions and process data, the computer system 120 can include one or more central processing units or processors 124 that includes the electronic circuitry to perform software operations. To store the software instructions and data, the computer system 120 can also include memory 126, which may be in the form of random access memory or other volatile memory, read only memory or other permanent memory, or another suitable form of memory. The processor 124 may be in direct or indirect digital or electronic communication with memory 126 to send and receive instructions and data. The computer system 120 may also include more permanent forms of memory 128 such as hard drives or backup disks having magnetic storage, optical storage, or other long term storage capabilities. The data that is processed and stored by processor 124 and the memory 126 may be associated with a data structure 130 that defines the organization and/or type of data. To interact with a user, the computer system 120 can also include one or more input/output interfaces 132 such as LCD or CRT displays, keyboards, mice, touchpads, etc.

The computer system 120 can be in operative communication with various controllers, terminals, scanners, sensors, and the like disposed about the material handling facility 100 including the ASRS 112. In particular, the computer system 120 can send and receive electronic signals in digital or analog formats to communicate with the material handling facility 100. The communication can occur via wires or buses, wirelessly such as by Bluetooth, fiber optical wave guides, or the like. The computer system 120 can be programmed or configured to assist in conducting operations at the material handling facility 100. In an example, the computer system 120 can be part of an inventory management system that tracks, monitors, and manages the flow of the items and goods through the material handling facility. The computer system 120 can cooperate with the ASRS 112 in particular to transfer items and goods to and from the storage units 110 and the other areas of the material handling facility 100 such as the receiving area 102 and point-of-sale area 108. For example, in a retail facility, items and goods are typically held in bulk in the storage area 104 until needed at the point-of-sale area 108. Various components or functions of the computer system 120 can be on-location or optionally remote or off-location.

Figure 2:
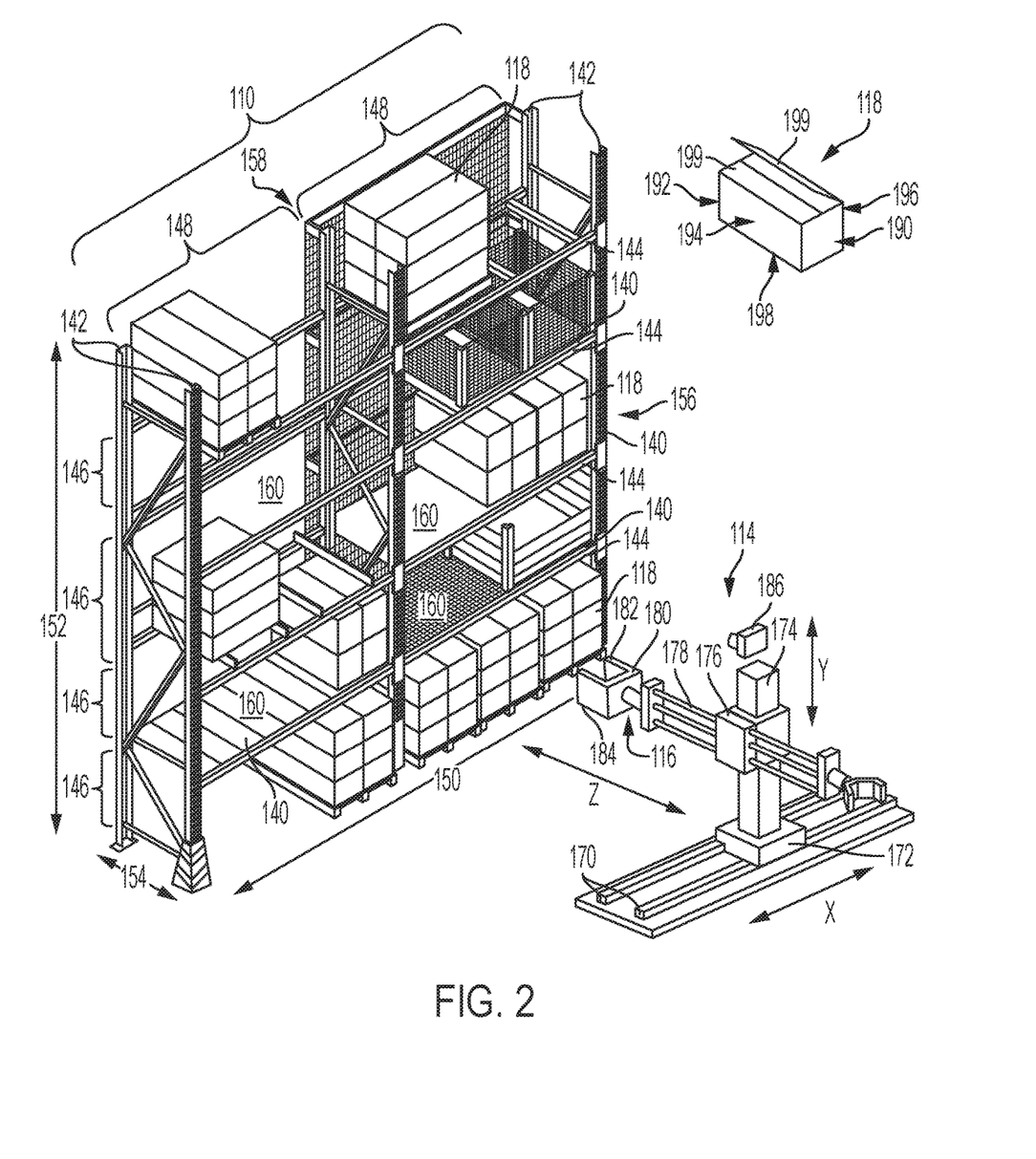
FIG. 2 is a perspective view of an example of the automated storage and retrieval system including a storage and retrieval machine having a retrieval tool to access containers containing items on shelves of a storage unit.

Referring to FIG. 2, there is illustrated an example of how the storage units 110 and the ASRS 112 may interact to place and retrieve items and goods. The storage unit 110 can be configured as a plurality of horizontally disposed shelves 140 in a vertically spaced relation that are supported by a plurality of uprights 142 and horizontal beams 144. The uprights 142 and the horizontal beams 144 can be interconnected to form the framework of the storage unit 110. Moreover, the uprights 142 and horizontal beams 144 can segment or separate the storage unit 110 and the shelves 140 into a plurality of horizontal rows 146 and a plurality of vertical bays 148. Because multiple rows 146 and bays 148 may be included, the storage unit 110 can be associated with a lateral dimension 150 in the horizontal orientation and an elevation dimension 152, or height, in the vertical orientation. In addition, the storage unit 110 may be associated with a depth dimension 154, or shelf depth, between the face 156 and back 158. The empty space between adjacent shelves 140 within each bay 148 can be referred to as a receptacle 160 and the intersections of the plurality of vertical uprights 142 and horizontal beams 144 provides a plurality of receptacles 160 arranged in a grid-like pattern. The receptacles 160 can be accessed through a corresponding opening provided at the face 156 and/or back 158 of the storage unit 110. In an example, the storage unit 110 can be an open type unit in which the receptacles 160 are accessible from both the face 156 and the back 158. In another example, the storage unit 110 can be a closed type unit closed on the back, sides, and the top or canopy by panels. The storage unit 110 may be configured as racking or a rack system if the weight-bearing capacity is significantly high. The storage units 110 may also have other configurations such as cabinets, cases, bins, floor locations, or the like.

To access different receptacles 160 in the storage unit 110, the storage and retrieval machine 114 of the ASRS 112 can be configured to travel through the material handling facility. In the example illustrated in FIG. 2, the storage and retrieval machine 114 can travel along one or more rails 170 disposed over the floor of the material handling facility in predetermined routes or the storage and retrieval machine may be disposed on a conveyor system. In other examples, the storage and retrieval machine 114 can be disposed on wheels or continuous tracks for independent mobility. In other examples, the storage and retrieval machine 114 may be suspended from the ceiling or overhead rails similar to a gantry crane. In other examples, rather than a storage and retrieval machine 114, the ASRS 112 can include a robotic arm disposed in a fixed location but having articulated or rotary joints movable in various degrees of freedom. The robotic arm is therefore able to move with respect to the stationary storage unit.

To allow the storage and retrieval machine 114 to further maneuver and movably manipulate the containers 118, the storage and retrieval system can be configured as an articulated robot having movable joints, links, or sleeves that allow movement of the end effector or retrieval tool 116 in multiple degrees of freedom. For example, as illustrated in FIG. 2, the storage and retrieval machine 114 can be configured as a Cartesian coordinate type robot capable of movement with respect to at least three axes. To move along the rails 170 disposed through the material handling facility, the storage and retrieval machine 114 can include a base 172 supported on and slidable with respect to the rails. The rails 170 can guide the base 172 along the linear direction or axis, indicated by X, similar to a linear slide. Moreover, the rails 170 can be generally parallel to the storage unit 110 so that the storage and retrieval machine 114 can move parallel with respect to the lateral dimension 150 of the storage unit. The base 172 can include bearings, dovetail channels, or other suitable features to engage the rails 170. Projecting vertically upwards from and supported by the base 172, in the vertical direction or axis indicated by Y, can be a column 174. The column 174 can have any suitable height and may correspond in height to the storage unit 110. Disposed around the column 174 can be a movable collar 176 that is configured to raise or lower itself with respect to the column in the vertical direction Y. Hence, the collar 176 can move with respect to the elevation dimension 152 of the storage unit 110 to move between and become vertically coextensive with the different rows 146 of the storage unit. To move perpendicularly toward or away from the storage unit 110 along the linear dimension or axis indicated by Z, the storage and retrieval machine 114 can include a slidable arm 178 supported by the collar 176. The slidable arm 178 can therefore be inserted into and retracted from the receptacles 160 of the storage unit 110 by moving with respect to the depth dimension 154 of the shelves 140.

To retrieve containers 118 from the shelf 140 of the shelving unit 110, the storage and retrieval machine 114 can include the retrieval tool 116, also referred to as an end effector, disposed at the distal end of the slidable arm 178. As an example, the retrieval tool 116 may be a jaw-like gripper 180 designed to grasp and firmly hold the container 118. The gripper 180 may include bifurcated first and second gripper fingers 182, 184 that are opposed to and spaced apart from each other. The gripper 180 may also include actuators that enable the first and second gripper fingers 182, 184 to move apart or together with respect to each other. The first and second gripper fingers 182, 184 may be joined at a common pivot point to articulate with respect to each other or may translate linearly with respect to each other. In operation, the gripper 180 is positioned so that the object to be grasped is between the spaced apart first and second gripper fingers 182, 184 and the actuators are activated to close and clamp the object between the gripper fingers. The gripper 180 may be moved to lift the object with the object securely held by the clamping force between the first and second gripper fingers 182, 184 and the frictional forces between the surface of the object and the gripper fingers prevent the object from sliding. This interaction may be referred to as force grasping or frictional grasping. However, other grasping techniques may be used with the gripper. Additionally, other examples of retrieval tools and/or end effectors, such as those functioning by attractive forces including magnetic forces, electrostatic forces, vacuum suction, or adhesives, are also contemplated by the disclosure.

The storage and retrieval machine 114 may include additional features to facilitate retrieval of the containers 118 from the storage units 110. For example, the storage and retrieval machine 114 may include a camera 186 or other optical sensor to visually guide movement of the storage and retrieval machine with respect to the storage unit 110, the containers 118 therein, and the rest of the material handling facility. Other examples of sensory devices include LIDAR, radiofrequency or sonic range finders, motion sensors, inertial measurement units, magnetic sensors, GPS, and the like. In the example where the retrieval tool 116 is a gripper 180, the retrieval tool may include tactile feedback controls to monitor and adjust the clamping force exerted by the gripper. In addition to moving with respect to the three principal Cartesian axes X, Y, and Z, the storage and retrieval machine 114 may be configured to move in additional degrees of freedom, for example, by including rotational couplings or bearings at the intersections of the base 172 and column 174 and the slidable arm 178 and the retrieval tool 116.

As indicated, the items and goods may be packaged in containers 118 such as cardboard cartons or plastic crates. For example, a number of individual items and goods may be packaged in bulk in a container to facilitate shipment to the material handling facility. An example of a container 118 is illustrated in FIG. 2. The containers 118 provide an enclosed space to accommodate and keep together multiple items or goods. The container 118 can be configured as a three dimensional polyhedron such as a square or a rectangle and in particular may be a box-like structure having multiple integral or conjoined panels. For example, the container 118 may include a front panel 190, a rear panel 192, a first side panel 194, a second side panel 196, as well as a bottom panel 198 and a top panel 199. The panels can be orthogonally arranged with the front and rear panels 190, 192 parallel and opposed to each other, the first and second side panels 194, 196 parallel and opposed to each other, and the bottom and top panels 198, 199 parallel and opposed to each other. The containers 118 can be of any suitable construction including, for example, a carton formed from a flat cardboard blank in which panels are integrally formed and joined along fold lines to facilitate assembly into the three dimensional carton. Another example of a container 118 can be a re-useable shipping crate made of plastic where the top panel 199 is formed as a pair of doors pivotally attached to the respective first and second side panels 174, 176 to allow access to the interior. Any other suitable example of a container having a three dimensional, polyhedron-shaped configuration may be used with the present disclosure.

As illustrated in FIG. 2, when multiple containers 118 are in the storage unit 110, they may be placed in a closed packed configuration within the individual receptacles 160 in which the individual containers are adjacently abutting each other. The polyhedron shape enables containers 118 to be placed in a side-by-side relation with adjacent side panels abutting or in contact with each other. Additionally, multiple containers 118 may be stacked on top of each other. The individual containers 118 may be shaped to facilitate closed packing to the extent the abutting containers may substantially fill a receptacle 160. The closed packed configuration of the containers 118 facilitates efficient use of storage space and maximizes storage density. However, the closed packed configuration also impedes access to individual containers 118 by the retrieval tool 116 on the storage and retrieval machine 114 of the ASRS 112 and hampers automation. The following examples disclose ways of facilitating retrieval tool access by altering the container layout within the storage units, altering the geometry of the containers and/or retrieval tools, or a combination of these features.

Example 1

Figure 3:
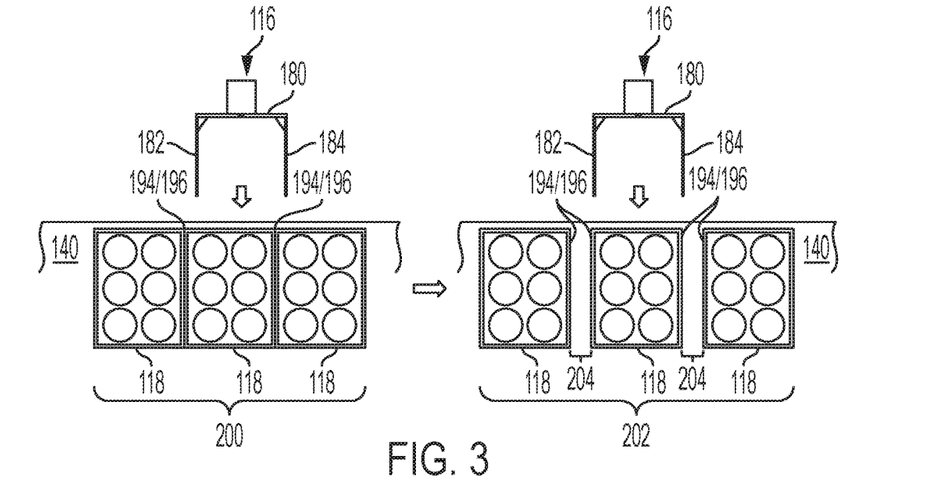
FIG. 3 is a block diagram illustrating an example of facilitating access to and handling of the containers in the storage unit by the retrieval tool of the storage and retrieval machine.

Referring to FIG. 3, there is illustrated a plurality of individual containers 118 disposed on top of a shelf 140. In a closed packed configuration 200 represented at the left, a plurality of individual containers 118 may be aligned in a row with their respective side panels 194, 196 abutting in physical contact. The closed packed configuration 200 does not provide clearance or access for the retrieval tool 116 to interact with an individual container 118 of the plurality to allow for retrieval of individual containers. Alternatively, if the gripper 180 of the retrieval tool 116 were inserted into the plurality of containers 118 in the closed packed configuration 200, the first and second gripper fingers 182, 184 could damage the individual containers 118 by tearing the first and second side panels 194, 196 during insertion. The first example redefines the layout of the individual containers 118 into a spaced-apart relation 202 as represented at the right. Redefinition of the container layout into the spaced-apart relation 202 provides clearances 204 between the individual containers 118 for access by the gripper fingers 182, 184 on the gripper of the retrieval tool 116. Once inserted into the clearances 204, the gripper fingers 182, 184 can be clamped against the opposing side panels 194, 196 of the container 118 so that the retrieval tool 116 can lift the container 118 by force or fiction during a friction-grasping interaction. The clearances 204 between adjacent containers 118 can take any shape or form and in some examples may be partial clearances so that adjacent containers remain in substantial contact to maintain the closed packed configuration. The gripper 180 with bifurcated first and second gripping fingers 182, 184 is an example of a frictional grasping device that holds an object by a clamping force or force closure effect and prevents it from slipping away due to friction. To facilitate the frictional grasping of the container, there may be disposed on the first and second gripper fingers a soft, compressible, or textured material.

Example 2

Figure 4:
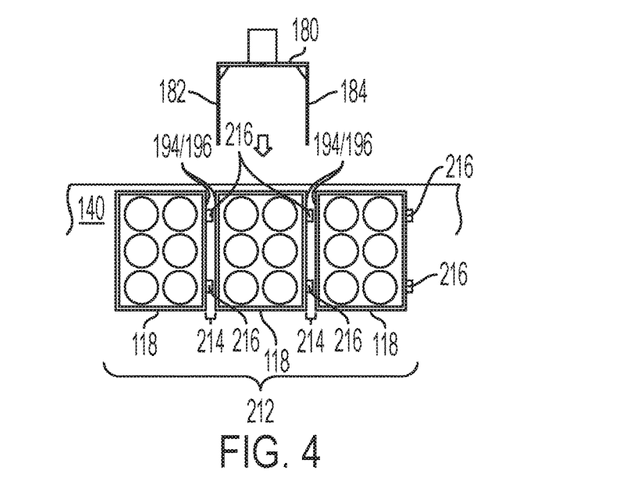
FIG. 4 is a block diagram illustrating another example of facilitating access to and handling of the containers in the storage unit by the retrieval tool of the storage and retrieval machine.

Referring to FIG. 4, there is illustrated an example of individual containers 118 configured with retrieval features to promote separation into a spaced-apart relation 212 and prevent abutment of adjacent containers associated with the closed packed configuration shown with respect to FIG. 3. In the illustrated example, the containers 118 can include a retrieval feature which may be one or more external protrusion 216 on one or both of the first and/or second side panels 194, 196. The external protrusions 216 function to offset the individual containers 118 from each other on the shelf 140 and provide a clearance 214 to receive the gripper fingers 182, 184 between the individual containers 118. The external protrusions 216 may be disposed on the side panels 194, 196 proximate to the bottom panel and close to the top surface of the shelf 140. In examples where the container 118 is constructed from cardboard blanks, the external protrusions 216 can be formed by appropriate cutouts or punch outs disposed into the blank which provides extra material once the container is formed. In another example, the external protrusions 216 can be provided by adhering additional material to the first and/or second side panels 194, 196 of the containers 118. In the example where the container 118 is constructed from molded plastic, the additional material for the external protrusions 216 can be provided during the molding process or by extruding, adhering, or sonically welding the additional material to the first and/or second side panels 194, 196.

Example 3

Figure 5:
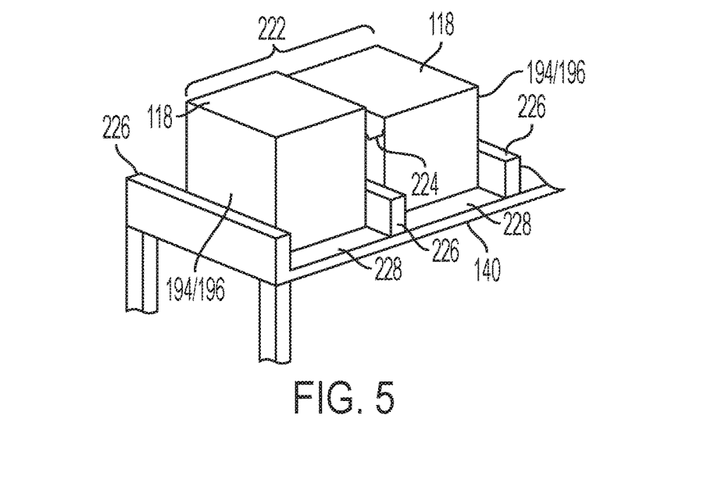
FIG. 5 is a block diagram illustrating another example of facilitating access to and handling of the containers in the storage unit by the retrieval tool of the storage and retrieval machine by utilizing retrieval features on the containers.

Referring to FIG. 5, there is illustrated an example in which individual containers 118 are located on a shelf 140 in a spaced-apart relation 222 with clearances 224 between the containers created by including a retrieval feature in the form of upright spacers 226 projecting upwards from the upper surface of the shelf 140. The upright spacers 226 alter the geometry of the shelves 140 in the storage unit and preclude the closed packed configuration of individual containers shown in FIG. 3. More particularly, the upright spacers 226 prevent the adjacent containers 118 from being placed in direct contact with each other. The upright spacers 226 provide slot-like channels 228 over the upper surface of the shelf 140 that can be sized to receive the individual container 118 and maintain separation between containers in adjacent channels 228. The gripper fingers can be inserted into the clearances 224 between containers 118 created by the upright spacers 222 to grip or grasp an individual container and lift the container by a frictional grasping interaction.

Example 4

Figure 6:
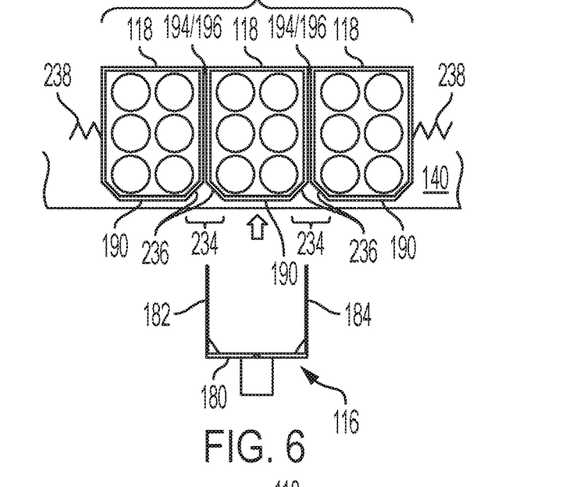
FIG. 6 is a block diagram illustrating another example of facilitating access to and handling of the containers in the storage unit by the retrieval tool of the storage and retrieval machine utilizing complementary retrieval features that may mate with each other.

Referring to FIG. 6, there is illustrated an example in which the individual containers 118 include retrieval features that enable the containers to generally maintain a closed packed configuration 230 on the shelf 140 in which a plurality of containers are aligned in a row in a physically abutting relation with the side panels 194, 196 in physical contact. In the illustrated example, the retrieval feature may be one or more chamfers, fillets, or bevels 236 formed into a corner or vertical edge of the individual containers 118. The bevel 236 can be formed at the intersection between the front panels 190 and the first and/or second side panels 194, 196 of the container 118. The bevels 236 may be straight or rounded, may be angled cuts, chamfers or fillets, and may either traverse the vertical height of the container or some smaller distance thereof. Because of the bevel features 236 disposed into the containers 118, triangular gaps or clearances 234 are provided proximate where the front panels 190 and the side panels 194, 196 intersect and where the front panels 190 align in parallel with each other. The clearances 234 allow for insertion of the gripper fingers 182, 184 on the gripper 180 between adjacent containers 118. Once inserted, the gripper fingers 182, 184 can be closed against the first and second side panels 194, 196 to grasp and lift the container 118 by force or friction via a friction-grasping interaction. In an example, to facilitate temporary displacement of adjacent containers 118 during insertion of the gripper 180 on the retrieval tool 116, one or more springs 238 can be placed at either end of the row of aligned containers 118 and can compress to accommodate the separation between adjacent containers caused by insertion of the gripper fingers 182, 184. After the gripper fingers 182, 184 are removed, the springs 238 may urge the row of aligned containers 118 against each other. In an example where the containers are polyhedrons or rectangular, the bevels 236 can be disposed along the four vertical edges or corners so that the containers 118 are symmetrical in shape and their forward and backward orientations are interchangeable. The foregoing is an example in which the clearance 234 provides partial separation between adjacent containers 118 that are otherwise in physical contact with each other to maintain a closed pack configuration to optimize storage density.

Example 5

Figure 7:
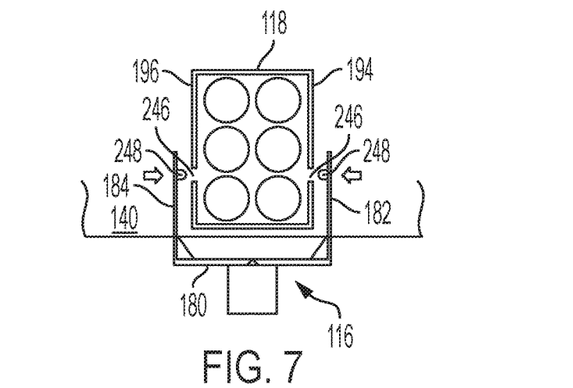
FIG. 7 is a block diagram illustrating another example of facilitating access to and handling of the containers in the storage unit by the retrieval tool of the storage and retrieval machine by utilizing a combination of disclosed features.

Referring to FIG. 7, there is illustrated an example in which the retrieval tool 116 and the individual containers 118 cooperatively interact to create the retrieval feature that facilitates retrieval of the container from the shelf 140. In the illustrated example, the individual containers 118 can include one or more apertures 246 disposed into either of the first and/or second side panels 194, 196. The apertures 246 may be formed partially into or completely through the first and/or second side panels 194, 196 and can have any suitable shape or size. To interact with the apertures 246, there can be disposed proximate to the distal ends of the first and second gripper fingers 182, 184 corresponding finger projections 248 adapted to mate with the apertures 246. The finger projections 248 can have any corresponding shape or size with respect to the apertures 232. The retrieval tool 116 is moved about the container 118 with the first and second gripper fingers 182, 184 along the opposing first and second side panels 194, 196 so that the finger projections 248 and the apertures 246 are vertically and laterally aligned. The spaced-apart gripper fingers 182, 184 can be closed so the finger projections 248 are received in the apertures 246, thereby mating the two features together. The mated finger projections 248 and apertures 246 provide a form-fit or mate-grasping interaction that, in addition to the friction-grasping interaction between the gripper fingers 182, 184 and the first and second side panels 194, 196, allows the retrieval tool 116 to grasp, lift, and remove the container 118 from the shelf 140.

Example 6

Figure 8:
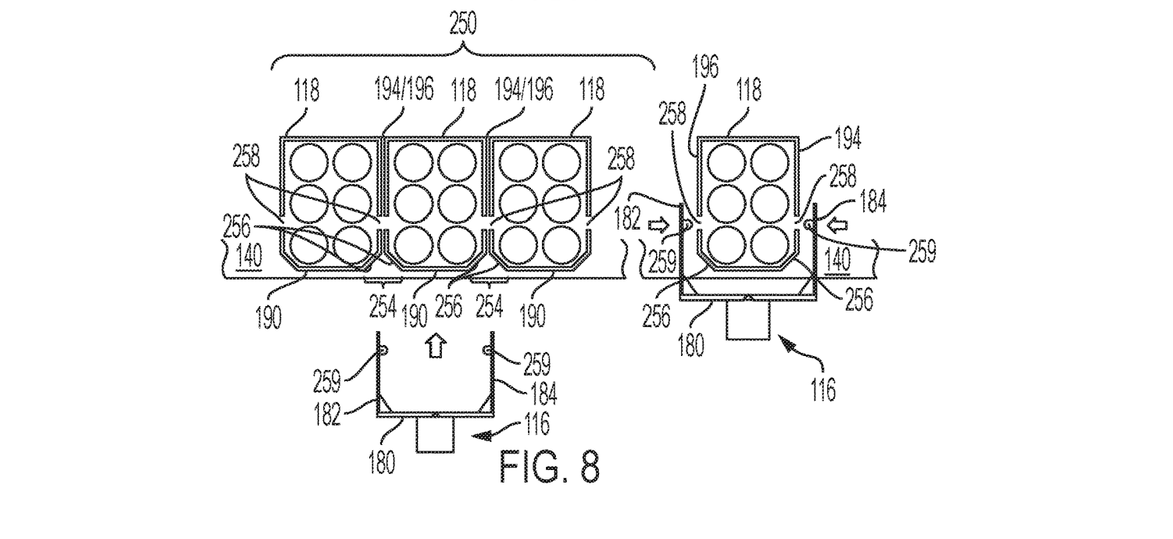
FIG. 8 is a block diagram illustrating another example of facilitating access to and handling of the containers utilizing a retrieval feature disposed in the container.

Referring to FIG. 8, there is illustrated an example which combines the retrieval features of some of the foregoing examples. In FIG. 8, a plurality of containers 118 can be aligned in a row on the shelf 140 initially in a closed packed configuration 250 with their respective first and second side panels 194, 196 in physical contact. In another example, the containers 218 may be initially maintained in a spaced-apart relation to facilitate grasping, such as, for example, by inclusion of external protrusions described in Example 2. The individual containers 118 may include any of the foregoing retrieval features such as bevels 256 formed into the vertical corners formed by the intersections of the front panels 190 and the first and second side panels 194, 196. The bevels 256 provide triangular clearances 254 between the adjacent containers 118 proximate where the front panels 190 align. An additional retrieval feature can be provided by cooperative interaction between the retrieval tool 116 and the container 118. For example, the container 118 may include an aperture 258 disposed into the first and second side panels 194/196 that can cooperate with a finger projection 259 disposed at the distal ends of the first and second gripper fingers 182, 184 on the gripper 180 of the retrieval tool 116. When the gripper fingers 180, 182 are inserted between adjacent containers 118 and the aperture 258 and finger projections 259 align, the gripper fingers can be closed against the first and second side panels 194, 196 to mate the two features together. Mating the finger projections 259 and the apertures 258 results in a form fit relation or interaction that, in addition to the friction or clamping force between the gripper fingers 182, 184 and the first and second side panels 194, 196, enables the retrieval tool 116 to grasp, lift and remove the container from the shelf 140. When the containers 118 are initially aligned in a closed packed configuration 250, manufacturing the containers from a compliant material such as cardboard may facilitate insertion of the gripper fingers 180, 182 between adjacent containers by allowing the first and second side panels 194, 196 to displace or stretch and accommodate the gripper fingers. It will be appreciated that other retrieval features, such as upright spacers projecting from the shelf top, may also be used with the present example.

Example 7

Figure 9:
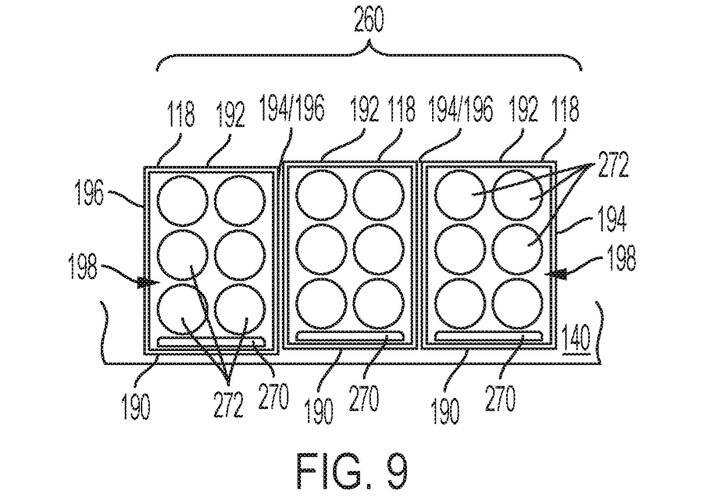
FIG. 9 is a block diagram illustrating the interaction of the container of FIG. 8 with the retrieval feature disposed therein and the retrieval tool of the storage and retrieval machine.
Figure 10:
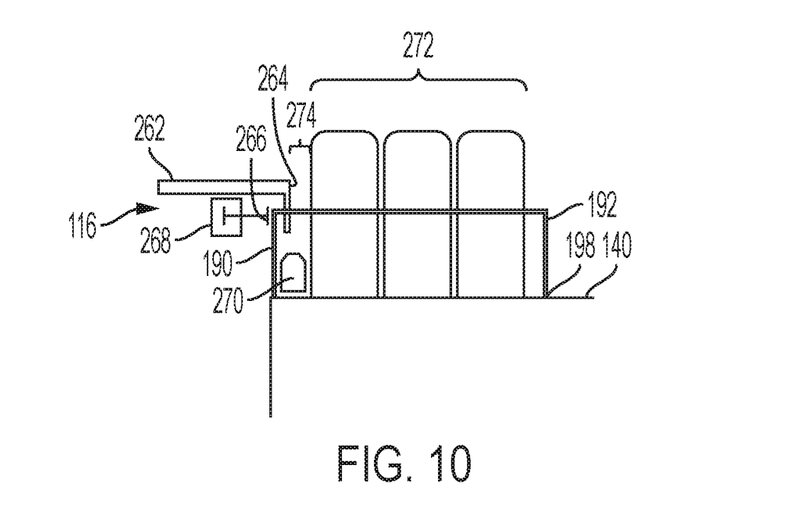
FIG. 10 is a side view perspective of the block diagram shown in FIG. 9.

Referring to FIGS. 9 and 10, there is illustrated an example in which the retrieval feature may be provided by altering the layout or construction of the container 118. The container 118 may be formed as an opened crate having front and rear panels 190, 192, first and second side panels 194, 196, and a bottom panel 198 interconnected together but lacking a top panel. Accordingly, the container 118 provides access to the items and goods contained therein due to the lack of the top panel. The containers 118 may also be initially arranged in a closed packed configuration 260 as illustrated with the first and second side panels 194, 196 in physical contact when aligned on a row on the shelf 140. To grasp the container 118, the retrieval tool 116 can be configured as a pincher clamp 262. Similar to a gripper, a pincher clamp 262 can include first and second opposed jaws 264, 266 that can be moved together or apart to create the grasping action. The first and second jaws 264, 266 may have a common pivot point to articulate with respect to each other or may translate linearly with respect to each other. In the illustrated embodiment, the jaws 264, 266 are positioned so they move horizontally with respect to the upper surface of the shelf 140 to grasp an object within the vertical plane. To enable the first and second jaws 264, 266 to move with respect to each other, pincher clamp 262 can include an actuator 268.

To enable the pincher clamp 262 to access and grasp the front panel 190 of the container 118, a spacer or separator 270 can be disposed inside the container between the front panel 190 and the items 272 contained therein. The separator 190 may be formed integrally with the front panel 190 or may be a separate component inserted into the container 118 with the items 272. The separator 270 can be shorter in height than the front panel 190 so that a channel or gap 274 is created between the front panel and the items 272 contained in the container 118. The gap 274 allows the first jaw 264 to be placed over the upper edge of the front panel 190 and into the container 118 so the front panel 190 is disposed between the first and second jaws 264, 266. When moved together, the first and second jaws 264, 266 pinch and grasp the front panel 190, allowing the pincher clamp 262 to lift and/or retrieve the container 118 from the shelf 140. The pincher clamp 262 is therefore a variation of a force or frictional grasping method in which the object is held due to a clamping force and prevented from sliding away from the retrieval tool due to frictional interaction.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:
1. An automated storage and retrieval system comprising:
   a storage and retrieval machine including a retrieval tool adapted to engage a container, the retrieval tool being a gripper with a first gripper finger and a second gripper finger spaced apart from and movably closable with each other;

a storage unit including a horizontal shelf;

a plurality of containers disposed on the horizontal shelf in an adjacent relationship, the containers having a polyhedron shape including a front panel, a rear panel, opposed first and second side panels, a bottom panel adjacent the horizontal shelf and a top panel opposed to the bottom panel;

wherein at least one of the retrieval tool, the containers, and/or the shelf is configured to facilitate access by the retrieval tool to an individual container of the plurality of containers such that the first gripper finger and the second gripper finger can be inserted between the individual container and adjacent containers to displace the adjacent containers and can be closed to clamp and hold the individual container there between by frictional grasping against the opposed first and second side panels.

2. The automated storage and retrieval system of claim 1, wherein a clearance is provided between adjacent containers to facilitate access by at least one of the first and second gripper fingers of the retrieval tool.

3. The automated storage and retrieval system of claim 2, wherein each container of the plurality of containers includes an external protrusion on one of the opposed first and second side panels of each container to provide the clearance between adjacent containers.

4. The automated storage and retrieval system of claim 2, wherein the plurality of containers are disposed on the shelf in a closed packed relation and the clearance is provided by a bevel disposed at an intersection of two panels of the container.

5. The automated storage and retrieval system of claim 2, wherein:

each of the opposed first and second side panels of the containers of the plurality has an aperture disposed therein: and at least one of the first and second gripper fingers includes a finger projection to mate with the aperture.

6. The automated storage and retrieval system of claim 1, wherein the storage and retrieval machine is a robotic arm movable in least three degrees of freedom to maneuver the retrieval tool disposed at the distal end of the robotic arm.

7. A method of retrieving a container comprising:

disposing a plurality of containers in a row on a horizontal shelf in an adjacent relationship, each container having a polyhedron shape including a first front panel, a rear panel, opposed first and second side panels, and a bottom panel adjacent the shelf and a top panel opposed to the bottom panel;

facilitating access to an individual container of the plurality of containers by providing clearances between adjacent containers in the row of containers;

moving first and second spaced apart and movably closable gripper fingers of a retrieval tool into the clearances on opposite sides of the individual container, and grasping the individual container between the first and second gripper fingers by inserting the first and second gripper fingers between the individual container and adjacent containers to displace the adjacent containers and movably closing the first and second gripper to clamp the individual container there between by frictional grasping against the opposed first and second side panels.

8. The method of claim 7, wherein the clearances are provided between the first and second side panels and the adjacent containers.

9. The method of claim 8, wherein the clearances are provided by a bevel disposed at an intersection between the first and second side panels and another panel of the container.

10. The method of claim 9, wherein the container is generally rectangular and a bevel is disposed at each corner.

11. The method of claim 8, wherein the clearances are provided by an external protrusion on each of the first and second side panels.

12. The method of claim 8, wherein each container of the plurality of containers includes apertures disposed in each of the first and second side panels, and wherein each of the first and second gripper fingers includes a finger protrusion adapted to mate with the apertures.

13. An automated storage and retrieval system comprising:

a storage and retrieval machine including a retrieval tool having spaced-apart first and second gripper fingers that are movably closeable with each other;

a storage unit including a horizontal shelf;

a plurality of polyhedron-shaped containers disposed on the horizontal shelf in a spaced apart relationship and each having a front panel, a rear panel, opposing first and second side panels, a bottom panel disposed on the horizontal shelf and a top panel opposed to the bottom panel;

wherein the spaced-apart first and second gripper fingers are adapted to to be inserted between the polyhedron shaped container and adjacent containers and displace the adjacent containers, the first and second gripper fingers further adapted to extend along and movably close upon the opposing first and second side panels and grasp the container using a form-grasping interaction and a mate-grasping interaction.

14. The automated storage and retrieval system of claim 13, wherein:

the spaced-apart first and second gripper fingers each include a finger projection; and the container includes apertures disposed in each side panel adapted to mate with the finger projections.

15. The automated storage and retrieval system of claim 14, wherein the container includes a bevel formed at an intersection of two panels of the container to provide a clearance with an adjacent container to facilitate access to at least one of the spaced-apart first and second gripper fingers.

\* \* \* \* \*